United States Patent

[11] 3,572,966

| [72] | Inventors | James H. Borden<br>Springfield;<br>Augustine J. Scalzo, Philadelphia, Pa. |
|------|-----------|---|
| [21] | Appl. No. | 791,892 |
| [22] | Filed | Jan. 17, 1969 |
| [45] | Patented | Mar. 30, 1971 |
| [73] | Assignee | Westinghouse Electric Corporation<br>Pittsburgh, Pa. |

[54] SEAL PLATES FOR ROOT COOLED TURBINE ROTOR BLADES
10 Claims, 6 Drawing Figs.

| [52] | U.S. Cl. | 416/95 |
| [51] | Int. Cl. | F01d 5/08 |
| [50] | Field of Search | 416/95 (S), 93 (L); 415/115—117, 180 |

[56] References Cited
UNITED STATES PATENTS
2,988,325  6/1961  Dawson............ 415/178(X)

FOREIGN PATENTS
590,513  1/1960  Canada............ 416/95

Primary Examiner—Everette A. Powell, Jr.
Attorneys—A. T. Stratton, F. P. Lyle and Elroy Strickland ABSTRACT: The invention comprises a structure for cooling the root portions of turbine rotor blades of the side entry type. The root portions are preferably of the serrated or fir-tree type and are received in complementary serrated recesses provided in the periphery of a rotor disc, the recesses extending axially through the disc. The root portions and recesses are formed to mate with each other, but provide clearance passages along the sides of the root which extend from the upstream face thereof to the downstream face thereof. Cooling fluid is directed to and past the roots by plate structures secured in an annular, peripheral channel provided in the disc, the channel and disc being provided with mating inclining surfaces extending in a radially outward direction towards the groove opening. With rotation of the rotor, the plates wedge in the opening to provide a sealed channel for directing the cooling fluid from internal passages provided in the rotor to the root portions of the blades.

Patented March 30, 1971 3,572,966
2 Sheets-Sheet 2
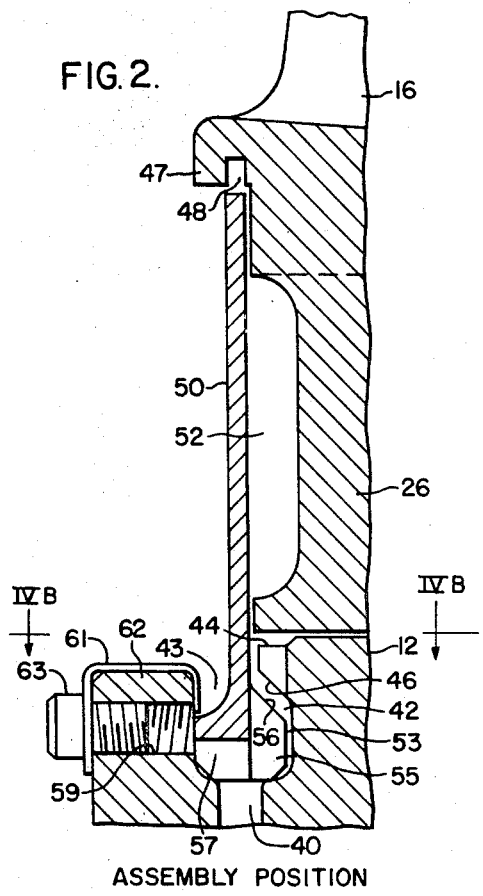
FIG. 2. ASSEMBLY POSITION
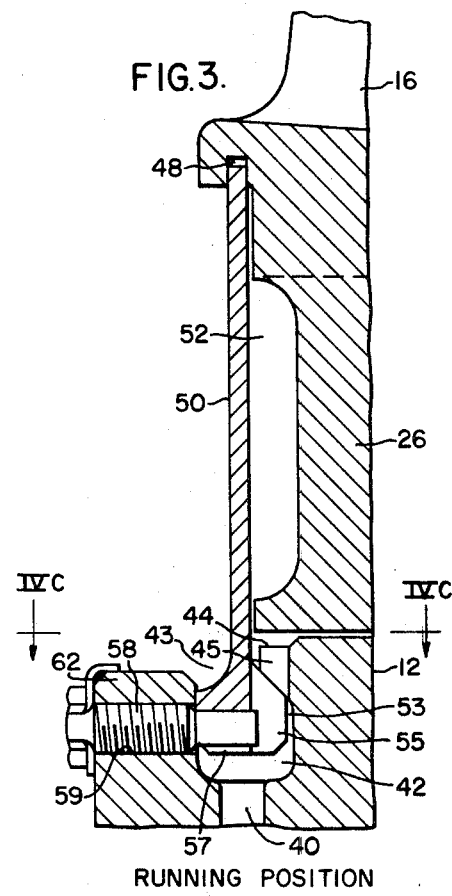
FIG. 3. RUNNING POSITION
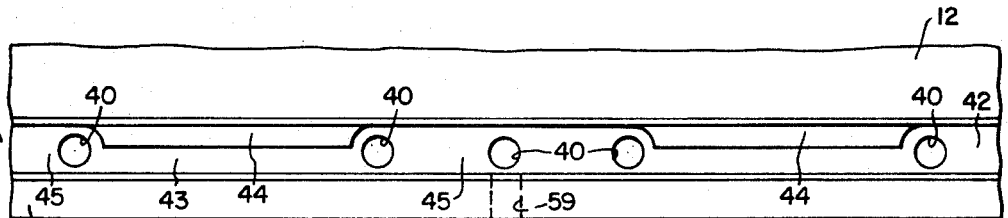
FIG. 4A
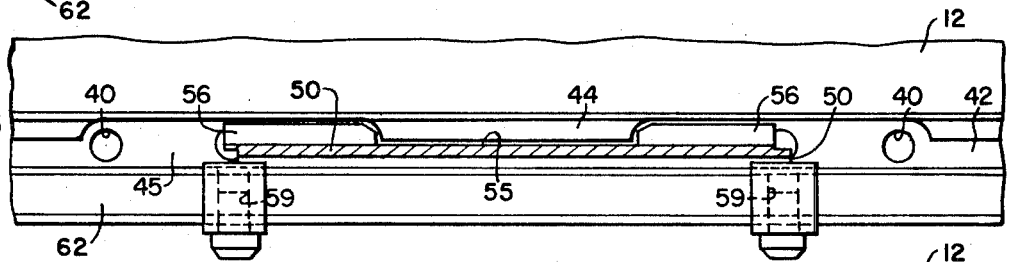
FIG. 4B
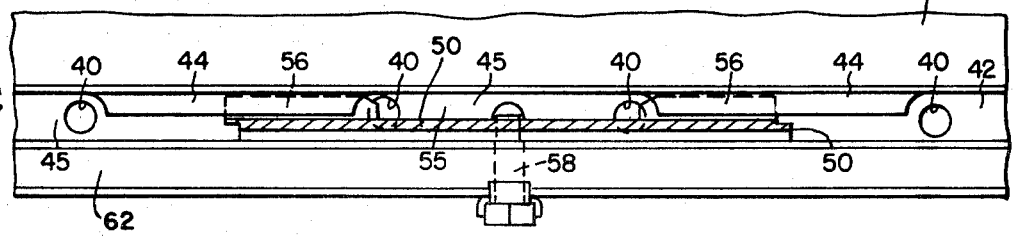
FIG. 4C

3,572,966

SEAL PLATES FOR ROOT COOLED TURBINE ROTOR BLADES

BACKGROUND OF THE INVENTION

The present invention relates generally to turbine rotors and particularly to a novel structure for locking turbine rotor blades (of the side entry type) in the periphery of a blade supporting disc and for forming cooling chambers for cooling the root portions of the blades.

In U.S. Pat. No. 3,501,249 issued Mar. 17, 1970 by Augustine J. Scalzo and Andrew Zabrodsky, and assigned to the present assignee, there is shown novel sideplate structure employed to axially secure turbine rotor blades of the side entry type in a rotor disc of a turbine, and to direct cooling fluid past the root portion of each blade. The cooling fluid supplied to the blade roots is first directed past the stator or nozzle blades of the turbine. In the aforementioned application, no means is provided to permit the use of cooling fluid supplied internally through the rotor disc or discs. For example, cooling air from an associated air compressor may be supplied directly through the rotor for cooling the turbine blades.

More specifically, in said application, a set of sideplates is employed to lock a single turbine blade in an axially extending recess provided in a rotor disc, one plate of the set being disposed on the upstream side of the disc and blade and the other plate disposed on the downstream side of the disc and blade. Each plate is provided with an opening to direct the cooling fluid axially past the root portions of blades, the root portions and disc recesses being formed and dimensioned to provide fluid directing passageways therebetween.

BRIEF SUMMARY OF THE INVENTION

Broadly, the present invention comprises novel plate structure secured in an annular groove or channel provided in a rotor disc on at least the upstream side thereof, the channel being provided with a relatively narrow opening. The plate and channel are provided with inclined mating surfaces within the channel which converge in a radially outward direction towards the narrow opening. When the disc is rotated, the centrifugal force of the plate, acting along the inclined surfaces, causes it to wedge in the narrow opening of the channel thereby sealing the channel from the conditions outside thereof. The channel, in turn, is connected in fluid communication with channels formed internally of the disc for directing a pressurized cooling fluid to the channel. From the channel, the cooling fluid is directed to the root portions of blades secured in the periphery of the disc through radially extending slots formed respectively in the disc and in the portion of the plate within the channel.

With the above, briefly described structure, the plates are firmly secured in the annular channel with rotation of the disc, the plates in turn sealing the narrow opening in the channel so that it is effective to direct cooling fluid to the roots of the turbine blades.

Further, the fluid-directing channel and slots formed in the rotor disc are employed for installing and removing the plates, so that no additional slots or grooves are required in the disc to allow entry of the plates. Also, with the present invention, the plates are installed in a radial direction so that a minimum of axial space in the turbine is required for purposes of plate installation and removal. For this reason, the plates can be installed and removed in the field since the rotor spindle does not have to be removed from the lower half of the inner and outer casings of the turbine to obtain the ordinarily needed, plate installation space. The criticality of spindle positioning, and thus the reasons for not disturbing the spindle after it is properly located, are explained in U.S. Pat. No. 3,493,212 by Scalzo and Zabrodsky which issued on Feb. 3, 1970 and which is assigned to the present assignee.

THE DRAWINGS

The invention, with its advantages and objectives, will be best understood from reading the following detailed description in connection with the accompanying drawings, in which:

FIG. 2 is an enlarged sectional view showing one of the sideplates of the invention in an assembly position with its associated rotor disc;

FIG. 3 is an enlarged sectional view of the plate structure of FIG. 2 in a running position in the rotor disc;

Figure 1:
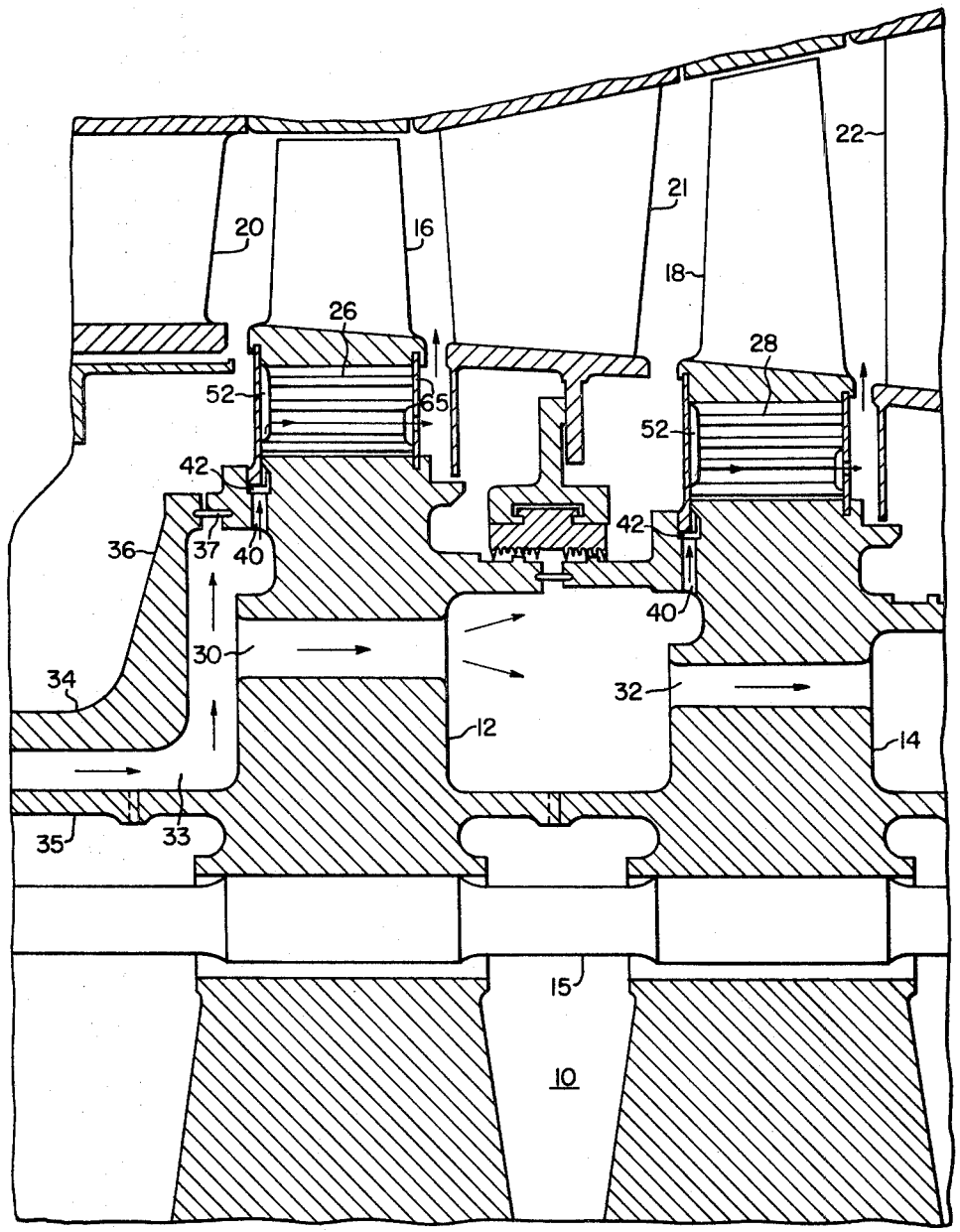
FIG. 1 is a longitudinal section of a bladed portion of an axial flow turbine having rotor discs and sideplates constructed in accordance with the principles of the invention.

FIGS. 4A, 4B and 4C show partial developed circumferential views of the rotor disc on a smaller scale than FIGS. 2 and 3 but somewhat larger scale than FIG. 1, where 4A is taken along line IVB–IVB in FIG. 2 before one of the sideplates is disposed for installation, 4B is taken along line IVB–IVB in FIG. 2 with the sideplate installed, and 4C is taken along line IVC–IVC in FIG. 3 with the plate in the final installed position.

PREFERRED EMBODIMENT

Referring to the drawings in detail, FIG. 1 shows a portion of a rotor 10 for an axial flow turbine in longitudinal section. The rotor may comprise an aggregate of rotor discs, only two of which (12 and 14) are shown, secured together by circumferentially disposed tie or staybolts 15 extending through the discs, only one tie bolt being shown in FIG. 1.

The discs 12 and 14 support, respectively, rotor blades 16 and 18 extending radially outwardly therefrom, the blades being disposed between axially spaced inwardly extending fixed stator or nozzle blades 20, 21 and 22. The rotor blades are respectively provided with root portions 26 and 28 of the side entry type which may be of the serrated or "fir-tree" type for disposition in serrated recesses (not shown) provided in the periphery of the discs. Such a construction is shown in the above-mentioned Scalzo and Zabrodsky U.S. Pat. No. 3,501,249. The root and recess serrations are formed and dimensioned to provide clearances which serve as channels for directing cooling fluid between the root and disc as shown and explained in said application.

The rotor discs 12 and 14 are further provided respectively with axially extending openings or channels 30 and 32. The channels are connected in fluid communication with a passageway 33 formed by a tubular fairing member 34 disposed in encompassing relation with a center torque tube structure 35. The torque tube is suitably secured to the disc 12, and to the stay bolts 15 at a left-hand location not shown in FIG. 1. The staybolts, in turn, extend through the torque tube to the rotor of an air compressor (not shown). In this manner, as well known n the art, the compressor and turbine rotors are mechanically connected together so that the compressor rotor rotates with the turbine rotor and the torque tube 35.

An annular radially extending flange portion 36 of the annular fairing member 34 is attached to the disc 12 through an annular seal 37. The other (left-hand) end of the annular member is attached to the torque tube 35 for rotation therewith and with the rotor 10.

Since the discs 12 and 14, and the blades 16 and 18 are substantially identical for purposes of the invention, hereinafter only the disc 12 and the blade 16 will be referred to, it being understood that the disc 14 and the blade 18 may be constructed in a similar manner.

The disc 12 is provided with circumferentially spaced, radially extending openings 40 on the upstream side thereof and near the periphery thereof. The openings 40 are formed in the disc to be in fluid communication with the passageway 33.

The upstream side of the disc is further provided with an annular, continuous groove or channel 42 facing in a radially outward direction as best seen in FIGS. 2 to 4. The groove is formed to be in fluid communication with the radially extending openings 40 as shown.

As best seen in FIGS. 2 and 3, the groove 42 is provided with a somewhat narrow entrance portion 43 formed by an axially extending circumferential ledge 44 of the disc. The ledge, in turn, is provided with circumferentially spaced slots 45, as best seen in FIG. 4, and an inclined surface 46 converging in a radially outward direction towards the entrance portion of the groove, as best seen in FIGS. 2 and 3.

The upstream side of the rotor blade 16 is further provided with an inwardly facing lip 47 having a groove 48, the groove 48 being in substantial radial alignment with the groove 42 in the disc 12.

The grooves 42 and 48 are dimensioned to accommodate an annular array of sideplates 50 which, when properly installed and secured in the groove forms a continuous circumferential coolant chamber 52 with the adjacent ends of the roots 26 of the blades 16. Only one such plate is shown in the FIGS.

Each sideplate 50, as best seen in FIGS. 2 and 3, is provided with a thick foot portion 53, in cross section, dimensioned to seat in the groove 42 provided in the rotor disc 12. The foot portion is provided with a slot 55, dimensioned to accommodate the ledge portion 44 between the slots 45 provided in the disc 12 (FIG. 4B), and a radially outwardly extending inclined surface 56, the surface being inclined at an angle supplemented to that of the inclined surface 46 of the slotted ledge of the rotor disc.

The foot portion 53 is further provided with an opening 57 (FIG. 2) dimensioned to accommodate the end of an indexing bolt 56 in the manner shown in FIG. 3. Circumferentially spaced threaded openings 59 are provided in the rotor disc for respectively receiving a like number of bolts 58.

The plates 50 are installed in the rotor 12, before the blades 16 are inserted in the disc, in following manner. All of the plates are radially inserted in the annular groove 42 by first aligning the slots 55 of each individual plate with the slotted ledge portion 44 of the rotor disc 12 in the manner shown in FIG. 4B. Each plate is then inserted radially into the groove, the thick portions of the foot 53, i.e., those portions having the inclined surfaces 56, being mated with the slots 45 provided in the ledge 44 of the disc, see again FIG. 4B.

After each plate 50 is disposed in the groove 42 it is held in the position shown in FIG. 4B. It is retained in place by the clip 61 extending around the ledge portion 62 of the disc 12, the foot portion 53 of the plate being disposed in the bottom of the groove. The clips are held in place by retaining the pins 63 respectively disposed in the threaded openings 59 provided in the disc.

After all the plates 50 are installed in the aforementioned manner they are moved circumferentially in the groove until the slot 55 in the plate is in radial alignment with the slot 45 provided in the disc ledge 44 as shown in FIG. 4C. In this manner, the annular chamber 52 is placed in fluid communication with the groove 42 and the openings 40 provided in the rotor disc.

After the installation of the plates 50 is completed and the plates are aligned in the disc as mentioned in the preceding paragraph, the blades 16 are installed from the downstream side of the disc by inserting the root portions 26 thereof respectively in the axial recesses (not shown) provided in the periphery of the rotor disc 12. Side insertion of rotor blades is described, for example, in the above cited Scalzo and Zabrodsky Ser. No. 739,274.

As seen in FIG. 2, the height of the plate 50 is such that the lip 47 of the blade clears the outer edge of the plate when the blade is installed. Thus, each blade 16 is moved into position adjacent the plate 50 to an axial location where the slot 48 in the blade is directly over the plate as shown in FIG. 2.

After a number of blades 16 are installed in the disc 12 for a distance equal to the length of one plate 50 (each plate being of a length sufficient to cover the ends of several blade roots 26) the clip 61 retaining the plate is removed. The plate is then lifted and secured in its raised position by the indexing bolt 58 as shown in FIG. 3. As shown, the radially outer edge of the plate extends into the slot 48 to be held by the lip 47 of the blade 16, and the inclined surfaces 46 and 56 of the disc and plate respectively are disposed in mating engagement or at least in close proximity to each other. The procedure is continued with each plate 50 until the entire disc is bladed and the annular channel 52 is formed.

The downstream end of the disc 12 and blade 16 may be provided with apertured sideplates 65 (FIG. 1) of the type shown and described in the last-mentioned Scalzo and Zabrodsky patent, though the present invention is not limited thereto.

With the structure and assembling procedure as thus far described, the removal and installation of the plates 50 can be readily accomplished in the field, i.e., at the site of the turbine installation, without requiring the removal of the rotor spindle from the lower half of the casings of the turbine. With the present invention, the plates are inserted and removed radially so that the rotor need not be moved or displaced in order to obtain the axial working space heretofore necessary for plate insertion and removal. As explained in the aforementioned Scalzo et al. U.S. Pat. No. 3,493,212, the positioning of the rotor is highly critical, so that once it is properly located, it should remain undisturbed if at all possible. As further explained in said application, the upper half of the casing surrounding the rotor is removed thereby exposing the upper half of the discs and blade rows. In FIG. 1 of the present disclosure, the removal of such a casing would remove the stator blades 20, 21 and 22 thereby leaving the axial space between the rotor blades open for servicemen to work therein when the plates 50 and the blades 16 need to be removed and reinstalled.

In operation of the rotor 10, a pressurized cooling fluid, such as air from the aforementioned compressor, is directed through the passageway 33 to the first disc 12. At the disc 12, the flow of air divides, part of the air traveling through the axial opening 30 in the disc 12 to the next disc 14. The remainder of the air is directed radially outward (upward in FIG. 1 as indicated by the appropriate arrows) to the openings 40 beneath the annular groove 42. The air is then directed to the slots 45 and 55 in the disc and plate by the annular groove 42. From said slots, the air passes into the annular chamber 52 formed by the plates 50 and the ends of the blade roots 26. The flow of air is then directed through the clearances between the blade roots and disc recesses, and to and through the apertured plate 65, as indicated by appropriate arrows in FIG. 1. In this manner the roots of the rotor blades and the rotor disc 12 are effectively cooled by the flow of air therethrough.

When the rotor 10 is rotated, centrifugal force is developed which forces the plates 50 in a radially outward direction. The inclined surface 56 of the foot portion 53 of each plate firmly engages, and moves upwards and outwardly along the inclined surface 46 of the disc 12 to wedge in the opening 43 of the annular groove 42. The wedging action closes the opening and seals the groove by forcing the plate against the inwardly facing surface of the ledge 62. For this reason, the cooling fluid directed to the groove, as explained above, can be directed to the annular chamber 52 through the slots 45 and 55 provided in the disc and plates with minimum leakage, if any.

Thus, the annular groove 42 serves two primary, important functions, namely, the accommodating of the plates 50 for assembly and disassembly purposes, and the directing of cooling air to the roots 26 of the blades 16.

In a similar manner, the slots 45 and 55 serve two primary important functions, namely, the directing of the cooling air to the annular chamber 52, and the allowance of plate installation in the disc 12 without the requirement of additional entry slots.

As mentioned earlier, the disc 14 and roots 28 of the rotor blades 18 may be cooled in the manner described above concerning the blades 16, as evidenced by the structure depicted in FIG. 1. With such a structure, cooling air is directed through the axial openings 30 in the first disc (disc 12), and through the space between the discs, to the radial openings 40 provided in the disc 14. If an adjacent disc or discs and blade rows are located downstream of the disc 14, a portion of the air directed to the disc 14 is directed therethrough to the next disc (not shown) by virtue of the openings 32 provided in the disc 14.

It should now be apparent from the foregoing description that a new and useful sideplate structure for sealing cooling channels in a turbine rotor in an unobvious manner has been disclosed, and that the disclosed structure permits the installation and removal of said plates in an unobvious manner.

Though the invention has been shown in a preferred embodiment, it will be obvious to those skilled in the art that it is not so limited, but is susceptible of changes without departing from the spirit and scope thereof. For example, the second row of rotor blades 18 may not require cooling and thus the sideplate structure, shown in FIG. 1, may not be required. Hot motive gases from fuel burners (not shown) reach the first row of blades 16 first so that the need for cooling the blades 16 is greatest. Thereafter, the gases expand and cool as they travel towards the next row of rotor blades 18.

We claim:

1. In a rotor for an axial flow fluid machine, said rotor comprising at least one rotor disc with axially extending recesses provided in the periphery thereof for receiving the root portions of rotor blades, the improvement comprising:
    an annular, continuous groove provided in said disc adjacent at least one end of said peripheral recesses, said disc having a ledge portion partially closing said groove to form a relatively narrow entrance portion thereto;
    said ledge portion having an inclined surface in said groove converging in a radially outward direction towards said entrance portion thereof;
    a plurality of plate structures each having a foot portion provided with an inclined surface converging in a radially outward direction;
    said foot portion being disposed in said groove with its inclined surface disposed in substantial mating engagement with the inclined surface of said ledge;
    said foot portions of said plates being effective to close the entrance portion of said groove to form a closed annular channel in said disc;
    the inclined surfaces being effective to wedge said plates in said groove to seal said annular channel when said disc is rotated; and
    said plates forming an annular coolant chamber with the ends of the blade root portions adjacent said plates.

2. The structure described in claim 1 in which the ledge portion of the rotor disc and the plate foot portions are provided with mating slotted portions, said slotted portions in the disc extending in a radial direction between the annular cooling chamber and the inclined surfaces, said slotted portions in the plate foot portion extending in a radial direction between the annular channel and the inclined surfaces, and the rotor being further provided with radially extending, internally formed openings connected in fluid communication with the annular channel for directing a cooling fluid thereto, said slotted portions being effective to direct the cooling fluid from the annular channel to the annular chamber and to the root portions of the turbine blades.

3. The structure described in claim 1 in which the plate structure is supported in the annular groove by an indexing bolt extending through a portion of the disc and into the plate structure.

4. The structure described in claim 1 in which the plate structures are disposed on the upstream side of the disc and rotor blades; and apertured plate structures disposed on the downstream side of the disc and rotor blades.

5. In a rotor for an axial flow fluid machine, said rotor comprising at least one rotor disc with axially extending recesses provided in the periphery thereof for receiving the root portions of rotor blades;
    an annular, continuous groove provided in said disc adjacent at least one end of said peripheral recesses;
    a groove and lip portion provided in each of the rotor blades in radial alignment with said annular groove;
    a plurality of plate structures adapted to be disposed and supported between said disc and blades and in said grooves to form an annular array of said plates;
    said plates and disc having mating portions which when in mating registry allow a radial insertion and removal of said plates into and from said disc, the outer edge of each plate extending to a radial location less than that of the radial edge of said lip portion when said plate is seated in the bottom of the groove in said disc;
    said mating portions further allowing the circumferential translation of said plates in said groove, to an out-of-registry position; and
    means for securing said plates in a radially extended position in said grooves, the outer radial edge of each plate extending into said grooves provided in said blades.

6. The structure described in claim 5 in which the mating portions comprise a ledge portion of the disc and foot portions of the plate structure, and further including a plurality of radially extending, circumferentially spaced slots provided respectively in said ledge portion and foot portions, said slots being radially aligned when the plate structures are circumferentially translated to direct cooling air to the blade roots.

7. The structure described in claim 5 in which the groove in the disc and the portion of the plate disposed in said groove are provided with outwardly converging inclined surfaces within said groove; said inclined surfaces adapted to be in mating engagement when the plate is secured in its extended position.

8. The structure described in claim 5 in which the plate is provided with a foot portion adapted to be disposed in the groove provided in the disc, said foot portion having an axially extending opening therein, and a bolt for securing said plate in a radially extended position in the groove, said bolt extending through a portion of the disc into said opening provided in said foot portion.

9. The structure described in claim 8 in which the foot portion and disc are provided with mating inclined surfaces for wedging the plate in the groove when the rotor is rotated.

10. The structure described in claim 5 in which the plates form an annular continuous chamber with adjacent ends of the blade root portions, and the mating portions comprising radially extending, circumferentially spaced slots provided respectively in the disc and plates, said slots extending between said annular chamber and the annular groove, said slots placing said chamber and groove in fluid communication with each other.